No. 769,987.                                              Patented September 13, 1904.

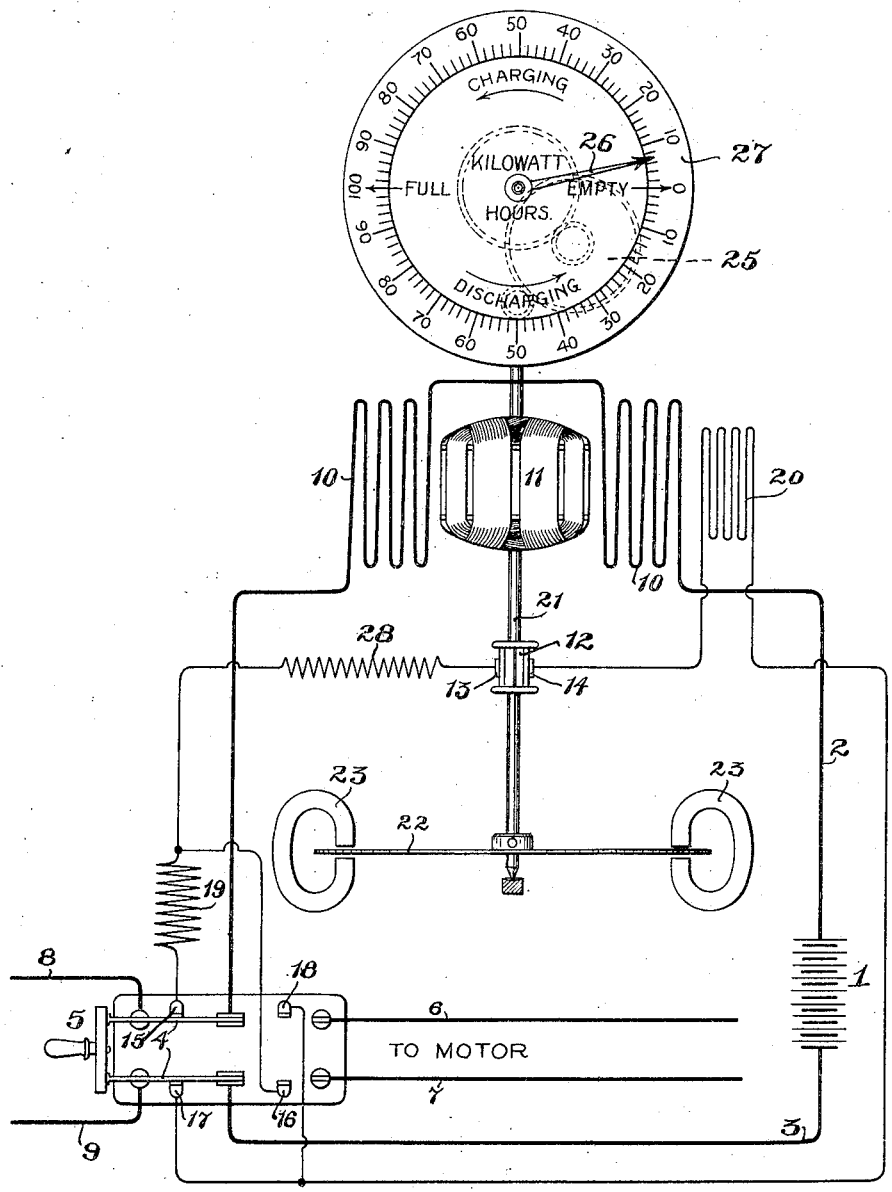

UNITED STATES PATENT OFFICE.

THOMAS DUNCAN, OF CHICAGO, ILLINOIS.

ELECTRIC METER.

SPECIFICATION forming part of Letters Patent No. 769,987, dated September 13, 1904.

Application filed July 18, 1901. Serial No. 68,757. (No model.)

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to storage-battery meters, and has for its object the provision of means whereby the indicator of the meter may be caused to progress uniformly in one direction as energy is being accumulated within the storage battery and discharged therefrom.

The devices of my invention may be useful in connection with meters that measure the energy either in units of watts or amperes.

In practicing my invention the index needle or pointer of the meter registers with a circular scale, having one portion of the scale marked to indicate the amount of current or energy accumulating within the storage battery, the contiguous portion of the scale indicating the amount of energy remaining in the battery while discharging. I provide means whereby the speed of operation of the indicator per unit of load or energy is increased when the meter is employed to indicate energy consumption, so that while the indicator is actuated to measure the current or energy accumulating within the battery it will operate at a lesser speed per unit of load or energy and an increased speed per unit of load or energy while the battery is discharging to compensate for battery loss. An armature is provided which produces a field proportional to the pressure, a current field-winding being inductively related to the armature-winding and included in series with the battery to be subject to the current flowing therefrom. There is employed a resistance or equivalent means for reducing the strength of the field of the armature when the meter is associated with a battery that is being charged, which resistance is dissociated from the armature when the battery is discharging to secure the proper rates of rotation of the armature per unit of load or energy in charging and discharging. There is also provided a starting-winding, preferably in the form of a single coil, to overcome the friction of moving parts, coöperating with the remaining meter elements to produce accurate measurement on light loads.

Heretofore it has been the custom to provide a meter for association with storage batteries whose index would rotate in one direction while the battery was being charged and in an opposite direction while the battery was being discharged. There were associated with this meter of the prior art two starting-coils, only one of which was included in circuit at a single time, one starting-coil producing a torque acting upon the rotatable element of the meter in one direction—as, for example, when the meter was associated with a battery that was being charged—the remaining coil serving to produce a torque in an opposite direction when the associated storage battery was discharging.

In accordance with my invention the torque of the meter is exerted upon the rotating element thereof in a uniform direction irrespective of the operative condition of the battery—that is, irrespective of the fact whether or not it is being charged or is discharging. To accomplish this result, I preferably provide means whereby the current through the armature is reversed when the direction of current through the field-winding is changed when the storage battery is disconnected from the translating means supplied with current therefrom and connected with a charging-machine, or vice versa. The starting-coil is preferably included in circuit with the armature, desirably in series therewith, so that each time the armature-current is reversed current through the starting-coil will be reversed to produce a subsidiary torque coöperating with the main torque of the instrument and effecting rotary effort upon the rotating element of the instrument in the same direction as the main torque. In practice I preferably provide a pole-changing switch that is operated each time the main circuit-changing switch is operated to change the relation of the storage battery with the translating means and the source of current for charging the same, so that immediately upon a change in direction of current through the main or current field-winding a corresponding change is effected in the direction of current through the armature. The resistance employed for reducing the rate of operation of the meter-index per unit of load or energy while the battery is being charged may simultaneously be included in circuit with the armature when the said battery is brought into circuit with the charging-machine, this resistance being excluded from circuit with the armature when the battery is connected with the translating means and disconnected from the charging-machine. These means for controlling the direction of current through the armature and starting-coil and for controlling the association of the torque-modifying resistance with the meter are preferably in the form of supplemental contacts with their circuit connections engaged by the blades of a main circuit-changing switch or disengaged therefrom, according to the manipulation of the switch, so that all necessary adjustments of the meter may be simultaneously effected with the operation of the main circuit-changing switch. Inasmuch as the index or indicating needle of the instrument rotates continuously in one direction, I provide means whereby this needle may be adjusted with reference to the dial without operating the remaining mechanism of the meter, so that when the battery is being charged the needle may be set in advance of the mark indicating "Empty" a distance corresponding to the available energy remaining in the battery. For this purpose the indicating-needle preferably has frictional engagement with the shaft or spindle upon which it is mounted, this engagement being sufficiently secure to prevent lost motion during the normal operation of the meter, while at the same time permitting the desired adjustment by hand.

I will explain my invention more fully by reference to the accompanying drawing, which is a diagrammatic view of a storage battery, a main circuit-changing switch, and a meter constructed in accordance with my invention associated therewith.

A storage battery 1 is connected by mains 2 3 with the switch-blades 4 4 of a main switch 5, which blades are adapted to connect the mains 2 and 3 with the mains 6 and 7, leading to translating means, as the motor of a motor-vehicle, when the switch is in one position or with the mains 8 and 9 leading to a charging source of current when the switch 5 is placed in an alternative position. The meter of my invention is provided with a current-winding subdivided into coils 10 10, included in series, for example, with the main 2 and a winding 11, preferably constituting a pressure-winding in the form of an armature, the winding being adapted for inclusion in bridge between the mains 2 and 3, preferably through the agency of the blades 4 4. For this purpose the meter-armature is preferably provided with a commutator 12, having brushes 13 14, the brush 13 being connected with a contact 15 upon the left of the blade-pivots and the contact 16 upon the right of the blade-pivots, while the brush 14 is connected with a contact 17 upon the left of the blade-pivots and the contact 18 upon the right thereof, by which arrangement the direction of current through the armature is reversed each time the main switch is thrown from one to the other of its alternative positions, so that the switch while effecting a change in direction of the current flowing through the main field-winding 10 will also effect a corresponding change of direction of current through the armature-winding, whereby the torque of the meter will continue to exert turning effort upon the rotating element thereof in one uniform direction. A compensating resistance 19 is also connected with the contact 15, so as to be included in circuit with the armature when the storage battery is being charged to reduce the rate of operation per unit of load or energy, this resistance being cut out of circuit when the switch 5 is thrown to an alternative position to thereby increase the torque of the meter per unit of load or energy to cause a faster operation thereof to compensate for battery loss. The starting-coil 20 by being included in series with the armature also has the direction of the current therein reversed each time the armature-current is reversed, so that the coöperative relation of the starting torque with the main torque of the instrument is unaffected. The armature of the meter is mounted upon a spindle 21, upon the lower end of which is a damping-disk 22, arranged within the fields of permanent magnets 23 in accordance with the well-known practice.

The shaft 21 may actuate the wheels of a train 25 to rotate the index-needle 26 continuously in one direction, which in the embodiment of the invention illustrated is a contra-clockwise direction. The needle 26 registers with the scale 27 circularly arranged, one half of the scale, from "Empty" to "Full," coöperating with the needle while the battery is being charged to indicate the quantity of energy accumulated, while the remaining half of the scale, from "Full" to "Empty," coöperates with the needle while the battery is discharging to indicate the amount of available energy remaining. If it should be desired to charge the battery while energy remains, the needle should be set in advance of the scale-mark "Empty" a distance corresponding to the amount of energy remaining, the needle having its anchored end frictionally engaged with its shaft to permit this adjustment. This adjustment of the needle is also useful where the battery has not been completely charged, the needle then being moved to the other side of the "Full" scale-mark reached by the needle in charging the battery. A choking resistance 28 may be also included in circuit with the armature to prevent the flow of too much current through the same.

While I have herein shown and particularly described the preferred embodiment of my invention, it is obvious that changes may readily be made without departing from the spirit thereof, and I do not, therefore, wish to be limited to the precise disclosure herein set forth; but,

Having thus described my invention, I claim as new and desire to secure by Letters Patent—

1. The combination with a storage battery, of switching mechanism for connecting the storage battery in circuit with the translating means supplied thereby and a source of current to charge the same, a meter in circuit with the battery, and means whereby the meter may be caused to rotate continuously in one direction while the battery is discharging and being charged, substantially as described.

2. The combination with a storage battery, of switching mechanism for connecting the storage battery in circuit with the translating means supplied thereby and a source of current to charge the same, a meter in circuit with the battery, and means whereby the meter may be caused to rotate continuously in one direction while the battery is discharging and being charged, the said meter being provided with a scale, a portion of which coöperates with the index of the meter while the battery is being charged and another portion of which coöperates with the index of the meter while the battery is discharging, substantially as described.

3. The combination with a storage battery, of switching mechanism for connecting the storage battery in circuit with the translating means supplied thereby and a source of current to charge the same, a meter in circuit with the battery, and means whereby the meter may be caused to rotate continuously in one direction while the battery is discharging and being charged, the said meter being provided with a scale, a portion of which coöperates with the index of the meter while the battery is being charged, and another portion of which coöperates with the index of the meter while the battery is discharging, the index of the instrument being adjustable with reference to its shaft, substantially as described.

4. The combination with a storage battery, of switching mechanism for connecting the storage battery in circuit with the translating means supplied thereby and a source of current to charge the same, a meter in circuit with the battery and means whereby the meter may be caused to rotate continuously in one direction while the battery is discharging and being charged, the said meter being provided with a scale, a portion of which coöperates with the index of the meter, while the battery is being charged and another portion of which coöperates with the index of the meter while the battery is discharging, the index of the meter being frictionally engaged with its shaft, substantially as described.

5. The combination with a storage battery, of switching mechanism for connecting the storage battery in circuit with the translating means supplied thereby and a source of current to charge the same, a meter in circuit with the battery, a starting-coil, and means whereby the direction of current through the starting-coil may be changed upon the operation of the aforesaid switching mechanism from one to the other of its operative positions, substantially as described.

6. The combination with a storage battery, of switching mechanism for connecting the storage battery in circuit with the translating means supplied thereby and a source of current to charge the same, a meter provided with two windings in circuit with the battery, means for changing the direction of current through one of the windings of the meter when the direction of current through the other winding of the meter is changed upon the operation of the aforesaid switching mechanism from one of its alternative positions to the other, whereby the rotating element of the meter is caused to rotate continuously in one direction while the battery is discharging and being charged, substantially as described.

7. The combination with a storage battery, of switching mechanism for connecting the storage battery in circuit with the translating means supplied thereby and a source of current to charge the same, a meter provided with current and pressure windings in circuit with the battery, and means for changing the direction of current in the pressure-winding of the meter when the direction of current through the current-winding of the meter is changed upon the operation of the aforesaid switching mechanism from one of its alternative positions to the other, whereby the rotating element of the meter is caused to rotate continuously in one direction while the battery is discharging and being charged, substantially as described.

8. The combination with a storage battery, of switching mechanism for connecting the storage battery in circuit with the translating means supplied thereby and a source of current to charge the same, a meter provided with two windings in circuit with the battery, means for changing the direction of current through one of the windings of the meter when the direction of current through the other winding of the meter is changed upon the operation of the aforesaid switching mechanism from one of its alternative positions to the other, whereby the rotating element of the meter is caused to rotate continuously in one direction while the battery is discharging and being charged, a starting-coil, and means for reversing the current through the starting-coil each time the main switching mechanism is changed from one of its alternative positions to the other, substantially as described.

9. The combination with a storage battery, of switching mechanism for connecting the storage battery in circuit with the translating means supplied thereby and a source of current to charge the same, a meter provided with current and pressure windings in circuit with the battery, means for changing the direction of current in the pressure-winding of the meter when the direction of current through the current-winding of the meter is changed upon the operation of the aforesaid switching mechanism from one of its alternative positions to the other, whereby the rotating element of the meter is caused to rotate continuously in one direction while the battery is discharging and being charged, a starting-coil, and means for reversing the current through the starting-coil each time the main switching mechanism is changed from one of its alternative positions to the other, substantially described.

10. The combination with a storage battery, of a manually-operated switch for connecting the storage battery in circuit with the translating means supplied thereby and a source of current to charge the same, a meter provided with current and pressure windings in circuit with the battery, and four contacts, two connected with each terminal of the pressure field-circuit and constituting, with the manual switch, a pole-changing switch for reversing the direction of current through the pressure field-winding each time the manually-operated switch is thrown from one to the other of its alternative positions to include the storage battery in circuit with its translating device and exclude the source of current for charging the same from circuit therewith, or vice versa, substantially as described.

11. The combination with a storage battery, of a manually-operated switch for connecting the storage battery in circuit with the translating means supplied thereby and a source of current to charge the same, a meter provided with current and pressure windings in circuit with the battery, four contacts, two connected with each terminal of the pressure field-circuit and constituting, with the manual switch, a pole-changing switch for reversing the direction of current through the pressure field-winding each time the manually-operated switch is thrown from one to the other of its alternative positions to include the storage battery in circuit with its translating device and exclude the source of current for charging the same from circuit therewith or vice versa, and a starting-coil in circuit with the armature, the direction of current through which is also and consequently changed each time the current through the pressure field-winding is reversed, substantially as described.

12. The combination with a storage battery, of a manually-operated switch for connecting the storage battery in circuit with the translating means supplied thereby and a source of current to charge the same, a meter provided with current and pressure windings in circuit with the battery, four contacts, two connected with each terminal of the pressure field-circuit, and constituting, with the manual switch, a pole-changing switch for reversing the direction of current through the pressure field-winding each time the manually-operated switch is thrown from one to the other of its alternative positions to include the storage battery in circuit with its translating device and exclude the source of current for charging the same from circuit therewith, or vice versa, and a resistance 19 included by the said manual switch in circuit with the pressure-winding when the storage battery is connected with the charging source of current and excluded from the pressure-winding when the storage battery is connected with its translating device, substantially as described.

13. The combination with a storage battery, of a manually-operated switch for connecting the storage battery in circuit with the translating means supplied thereby and a source of current to charge the same, a meter provided with current and pressure windings in circuit with the battery, four contacts, two connected with each terminal of the pressure field-circuit and constituting, with the manual switch, a pole-changing switch for reversing the direction of current through the pressure field-winding each time the manually-operated switch is thrown from one to the other of its alternative positions to include the storage battery in circuit with its translating device and exclude the source of current for charging the same from circuit therewith or vice versa, a starting-coil in circuit with the armature, the direction of current through which is also and consequently changed each time the current through the pressure field-winding is reversed, and a resistance 19 included by the said manual switch in circuit with the pressure-winding when the storage battery is connected with the charging source of current and excluded from the pressure-winding when the storage battery is connected with its translating device, substantially as described.

14. The combination with a meter, of a starting-torque winding therefor, and means for reversing the current in the winding, substantially as described.

15. The combination with a storage battery of switching mechanism for connecting the storage battery in circuit with the translating means supplied thereby and a source of current to charge the same, a meter in circuit with the battery, a starting-coil and switching apparatus for reversing the starting-coil when the aforesaid switching mechanism is actuated from one to the other of its operative positions, whereby the rotating element of the meter is caused to rotate continuously in one direction while the battery is discharging and being charged, substantially as described.

16. The combination with a storage battery, of switching mechanism for connecting the storage battery in circuit with the translating means supplied thereby and a source of current to charge the same, a meter provided with current and pressure windings in circuit with the battery and switching mechanism for reversing the pressure-winding when the aforesaid switching mechanism is actuated from one to the other of its alternative positions, whereby the rotating element of the meter is caused to rotate continuously in one direction while the battery is discharged and being charged, substantially as described.

17. The combination with a storage battery, of switching mechanism for connecting the storage battery in circuit with the translating means supplied thereby and a source of current to charge the same, a meter provided with current and pressure windings in circuit with the battery and switching mechanism for changing the direction of the current in one of the said windings of the meter when the aforesaid switching mechanism is actuated from one to the other of its alternative positions, whereby the rotating element of the meter is caused to rotate continuously in one direction while the battery is discharged and being charged, substantially as described.

18. A storage-battery meter having an index traveling in a uniform direction to indicate charge and discharge, the said meter being provided with a scale, a portion of which coöperates with the index of the meter while the battery is being charged to indicate the energy being charged in the battery and another portion which coöperates with the index of the meter while the battery is being discharged to indicate the energy discharged from the battery, substantially as described.

19. A storage-battery meter having an index adjustably secured in position traveling in a uniform direction to indicate charge and discharge, the said meter being provided with a scale, a portion of which coöperates with the index of the meter while the battery is being charged to indicate the energy being charged into the battery, and another portion which coöperates with the index of the meter while the battery is being discharged to indicate the energy discharged from the battery, substantially as described.

In witnesss whereof I hereunto subscribe my name this 27th day of June, A. D. 1901.

THOMAS DUNCAN.

Witnesses:
GEORGE L. CRAGG,
HARVEY L. HANSON.